United States Patent [19]

Chu et al.

[11] Patent Number: 5,019,760
[45] Date of Patent: May 28, 1991

[54] THERMAL LIFE INDICATOR

[75] Inventors: Frank Y. Chu, Islington; Blake A. Lloyd, Mississauga, both of Canada

[73] Assignee: Electric Power Research Institute, Palo Alto, Calif.

[21] Appl. No.: 447,266

[22] Filed: Dec. 7, 1989

[51] Int. Cl.$^5$ .............................................. G01K 3/04
[52] U.S. Cl. ........................... 318/490; 324/158 MG; 361/25; 374/102
[58] Field of Search ...................... 318/471, 472, 490; 324/158 MG; 361/25, 27; 374/101, 102, 103

[56] References Cited

U.S. PATENT DOCUMENTS

| | | | |
|---|---|---|---|
| 3,209,249 | 9/1965 | Warfield | 324/65 |
| 3,301,058 | 1/1967 | Roberts | 73/339 |
| 3,638,495 | 2/1972 | Sessler | 374/103 |
| 4,525,763 | 6/1985 | Hardy et al. | 324/158 MG |
| 4,733,974 | 3/1988 | Hagerman | 374/103 |

OTHER PUBLICATIONS

NUS Corporation and I. L. Brancato, "Life Expectancy of Motors in Mild Nuclear Plant Environments", Electric Power Research Institute, Final Report, Feb. 1985, pp. 6-17 to 6-25.

"Guiding Principles in the Thermal Evaluation of Electrical Insulation", L. J. Berberich and T. W. Dakin; AIEE Aug. 1956.

Primary Examiner—Bentsu Ro
Attorney, Agent, or Firm—Leonard Bloom

[57] ABSTRACT

A method for continuously determining the consumed insulation life of an electrical winding in a rotating machine is described incorporating the steps of selecting constants based on the class of insulation material and rotating machine power rating, measuring the temperature of the insulation over time, determining the consumed life of the insulation for consecutive periods of time and summing the consumed life. The invention overcomes the problem of determining consumed life of electrical insulation.

2 Claims, 3 Drawing Sheets

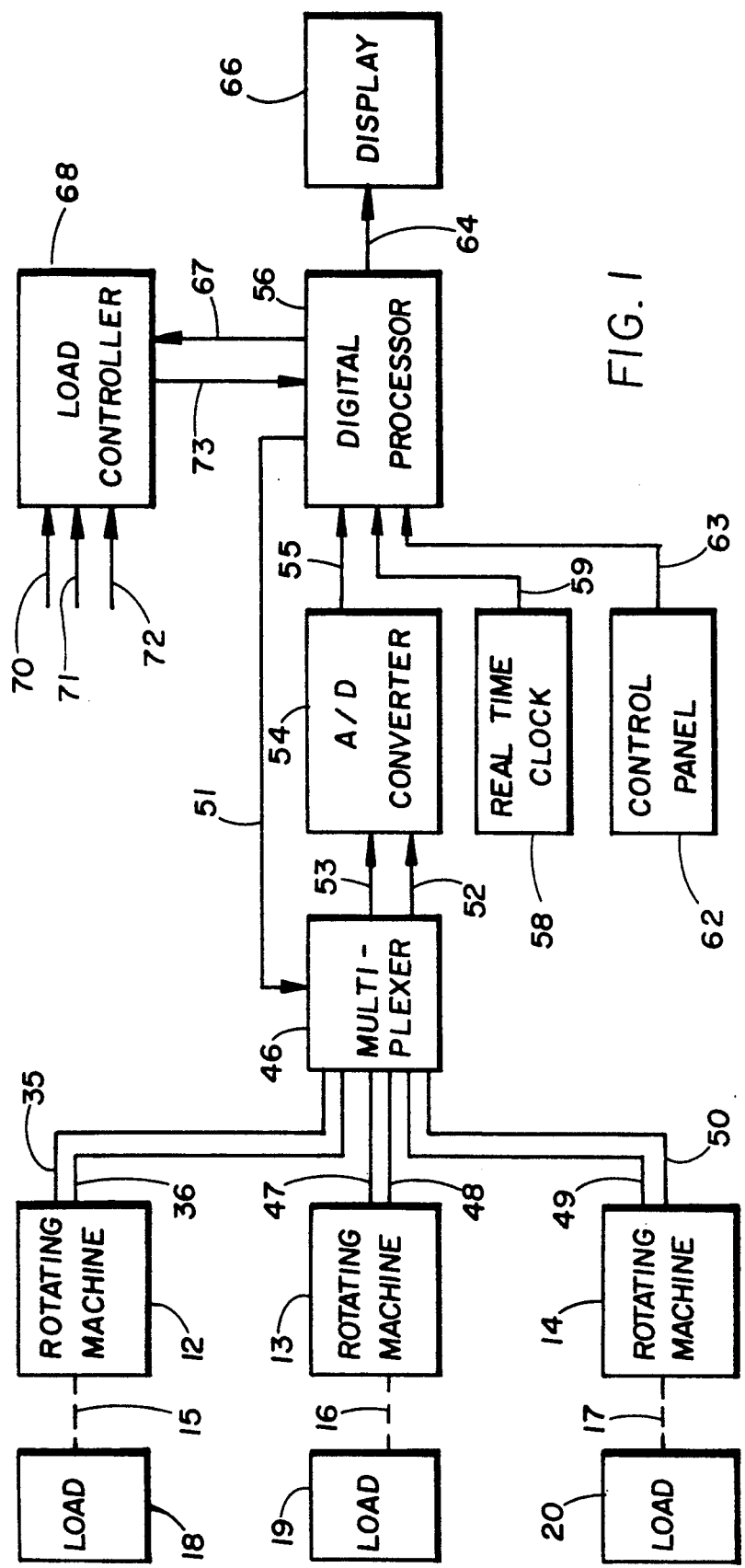
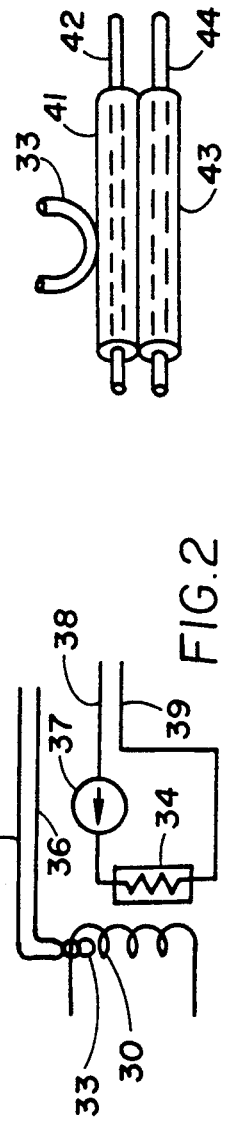

THERMAL LIFE INDICATOR

BACKGROUND OF THE INVENTION

Field of the Invention

This invention relates to insulation in rotating machines and more particularly to the consumed life of insulation where temperature is the primary aging factor.

Description of the Prior Art

A rotating machine such as a motor may have a finite useful life determined by the thermal aging of the insulation of its windings, i.e. stator winding. It is well known that thermal aging of insulation may be estimated by the use of a mathematical expression known as the Arrhenius equation wherein thermal aging increases by a factor of two for every ten degrees centigrade rise in temperature of the insulation.

It is known in the art to measure the temperature of electrical windings by the use of a thermocouple or resistive temperature device (RTD) embedded in the winding.

Where power transformers normally have a single insulation class for oil and paper, motors have a wide variety of insulation classes from A to H. Further motors have a service factor (SF) which is based on the horsepower of the motor. The service factor may arise from the fact that higher horse power motors have increased transient currents which may cause greater thermal excursions during starting and stopping of the motors or for a change operating speed. Transformers do not have a service factor constant.

Thermal aging is the dominant failure mode in windings of some rotating machines. The ability to predict the end of useful life of a rotating machine may facilitate the use of preventive maintenance to replace the windings, schedule maintenance or change the operating load on the rotating machine. For example, two electric motors operating pumps in a public utility power plant having different loads over time maybe interchanged physically to balance the aging of the motors to a common scheduled maintenance time when their windings can be replaced.

Electrical generators likewise experience thermal aging of their insulation as a dominate failure mode, which in turn determines the end of its useful life as in motors.

In U.S. Pat. No. 4,733,974 which issued on Mar. 29, 1988 to R. E. Hagerman, a method and apparatus was described for computing the life expectancy of equipment, and more particularly, the life expectancy of electrical power transformers. Conceptually, '974 describes an hour meter which instead of running in calendar hours, runs at a rate determined by the Arrhenius function of the temperature of the device being monitored. The life consumption system consisted of a function generator, consumption rate generator, accumulator and a display.

In U.S. Pat. No. 3,301,058 which issued on Jan. 31, 1967 to W. L. Roberts, an apparatus is described for registering the operational age of electrical equipment as a function of its time of operation and the temperature of its electrical insulation during such operation. The apparatus as described is designed to furnish an indication of the unexpended life of electrical equipment such as, for example, large electrical drive motors used in steel mill operations. The apparatus measures the expended useful life of the insulation by monitoring the running time of the motor and the temperature of its windings. Thermostats that are normally open are embedded in the insulation and are set by adjustment to close when the insulation reaches the respective temperatures set by adjustment. For example, the thermostats may be set at 10° C. intervals which in turn operate a counter at a rate which doubles each time a thermostat closes indicating a rise of 10° C. from the prior thermostat. The counter in effect registers the operational age of electrical equipment in a manner that is determined by the time the equipment is in operation and the temperature of its electrical insulation.

In U.S. Pat. No. 3,209,249 which issued on Sept. 28, 1965 to R. W. Warfield, a method of indicating thermal stability of bulk polymers is described. The thermal stability and thermal degradation characteristics of bulk polymers, propellants, and prepellant binders is determined by measuring the electrical volume resistivity of such bulk polymers, propellants, and propellant binders under conditions of pyrolysis.

In a publication by NUS Corporation of Menlo Park, Calif. and E. L. Brancato entitled, "Life Expectancy of Motors in Mild Nuclear Plant Environments", Electric Power Research Institute, Final Report, Feb. 1985, pp. 6-17 to 6-25, examples 6-1 through 6-4 show calculations and formulas for calculating the percent lifetime at X percent load for class F and class H insulation. Table 6-4 shows the approximate effect of loading on motor life for motor insulation systems, i.e. Classes A, B, F and H. The use of a higher insulation rating from Class B to Class F in a motor is shown in example 6-4. The effects of repeated starting of motors is described on pages 6-23 through 6-25.

SUMMARY OF THE INVENTION

An apparatus for continuously determining the consumed insulation life of an electrical winding in a rotating machine is described, comprising a control panel for allowing entry of a service factor constant SF and two aging constants $T_R$ and HIC, a sensor for measuring a temperature of the insulation, a clock for specifying a present time and date, and for outputting a timing signal defining a recurring time period, a processor coupled to the clock and sensor for receiving the timing signal, reading the measured temperature in accordance with the timing signal, determining the average temperature of the insulation during each time period over a plurality of consecutive time periods, determining the consumed life of the insulation for each time period, and summing the consumed life for a plurality of consecutive time periods to determine a total consumed life, and a display for displaying the total consumed life.

The invention further provides acquiring and integrating the insulation temperature with respect to time.

The invention further provides recording the history of operation from the start when the rotating machine is first placed into service or for accurately estimating the insulation life from the operating hours and from the output from the thermal life indicator over an extended period of time.

The invention further provides timely information for changing the load on rotating machinery.

The invention further provides timely information for replacing a rotating machine based on consumed insulation life.

The invention further provides timely information for scheduling preventive maintenance i.e., replace windings.

The invention further provides timely information for estimating the past life of a rotating machine.

The invention further provides timely information for comparing consumed life of the insulation of two or more motors.

The invention further provides a method for tracking the consumed life of insulation of several motors concurrently.

BRIEF DESCRIPTION OF THE DRAWING

FIG. 1 is a block-diagram of one embodiment of the invention.

FIG. 2 is a schematic diagram of a rotating machine winding with temperature sensors.

FIG. 3 is a simplified view of a temperature sensor next to the insulation of a winding.

DESCRIPTION OF THE PREFERRED EMBODIMENTS

Figure 4:
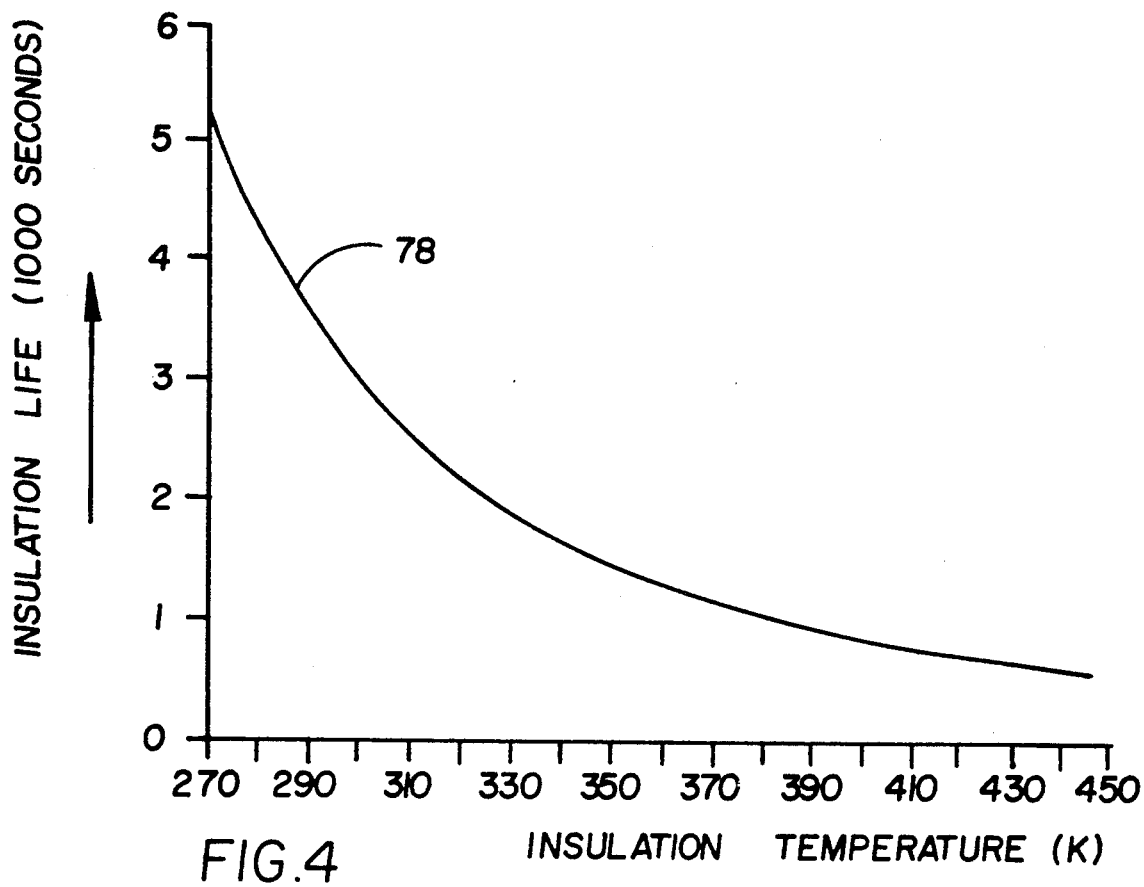
FIG. 4 is a graph of insulation life versus temperature.

Referring now to the drawing, FIG. 1 shows a thermal life indicator 10. Rotating machines 12, 13 and 14 are electrically or mechanically coupled as shown by reference lines 15–17 respectively, to loads 18–20 respectively. Rotating machines 12–14 may be, for example, electrical motors, generators, etc. containing electrical windings containing insulation to prevent shorting across the windings or to adjacent windings. Loads 18–20 may be, for example, pumps for pumping fluid such as in the recirculating loop of a nuclear power plant, conveyor belts for transferring material such as coal, or fans for circulating air, flue gases, etc. along ducts or through filters.

Rotating machines 12–14 may experience and ambient temperature due to the ambient atmosphere, exposure to the sun, exposure to heat conducted over mechanical linkages, heat conducted from fluids through rotating machine housings, etc., and heat created within rotating machines 12–14 due to electrical power dissipated in the windings. The primary power dissipated in the windings is due to the current passing through the ohmic resistance of the winding. The temperature of the winding, and more particularly the insulation, may vary as a function of the current passing through the winding which may vary as a function of load, start-up, and the ambient temperature of the winding.

Referring to FIG. 2, a schematic diagram of a rotating machine winding 30 is shown with temperature sensors 33 and 34. Temperature sensor 33 is placed next to the insulation of the winding 30 and may be, for example, a thermocouple having an output over leads 35 and 36. Temperature sensor 34 may be, for example, a resistance bulb or a thermistor having a current source 37 for passing current through temperature sensor 34 and over leads 38 and 39. The voltage across leads 38 and 39 provide an indication of the temperature of temperature sensor 34. Likewise the temperature across thermocouple 33 which may be, for example, a junction of two dissimilar metals is provided by a voltage over leads 35 and 36.

FIG. 3 is a simplified view of temperature sensor 33 next to insulation 41 which provides a cylindrical coating over wire 42. Winding 30 may also have insulation 43 providing a cylindrical coating about wire 44 which may be positioned adjacent wire 42 in winding 30.

Referring back to FIG. 1, rotating machine 12 may have a winding such as winding 30 with a temperature sensor 33 as shown in FIG. 2 coupled over leads 35 and 36 to an input of multiplexer 46. Rotating machine 13 may have a temperature sensor with leads 47 and 48 coupled to an input of multiplexer 46. Rotating machine 14 may have a temperature sensor having leads 49 and 50 coupled to an input of multiplexer 46. Multiplexer 46 functions to respond to control signals over lead 51 to couple the voltages from a temperature sensor from a respective rotating machine 12 to 14 over leads 52 and 53 to an input of analog to digital converter 54. Analog to digital converter 54 functions to provide a digital signal over lead 55 to an input of digital processor 56 in response to the voltage across leads 52 and 53.

Real time clock 58 functions to provide the time of day, month and year to digital processor 56 and to provide clock signals for determining predetermined time periods and time increments within the time periods over lead 59.

Control panel 62 is coupled over lead 63 to an input of digital processor 56. Control panel 62 provides a means for persons to enter data into the digital processor such as service factor constants, SF's, aging constants $T_R$ and HIC which may be a function of the power rating of the rotating machine and of the thermal class of insulation used in the windings of respective rotating machines. Digital processor 56 has an output over lead 64 to an input of display 66 which functions to provide visual information to an operator for inspecting the rotating machines. Digital processor 56 also provides an output over lead 67 to an input of load controller 68. Load controller may receive input signals over lead 70–72 from loads 18–20 respectively indicative of the real time load presently exerted or to be exerted on rotating machines 12–14 respectively. A transducer (not shown) may provide an indication of load from load 18 over lead 70.

Load controller 68 functions to provide signals over lead 73 to digital processor 56 indicative of the present load on loads 18–20 or the loads to be presented in the future on loads 18–20 such as by way of commands or from other transducers.

In operation, digital processor 56 generates control signals on lead 51 to multiplexer 46 to select a rotating machine and to measure the temperature through temperature sensor 33 of the insulation as a function of time during a time period. A/D converter 54 functions to convert the analog voltages to a digital signal over lead 55 to digital processor 56. Digital processor 56 functions to determine the average temperature of the insulation during each time period over a plurality of consecutive time periods. The average may easily be obtained by measuring the temperature every second for 60 seconds and to accumulate the temperature readings in the digital processor 56. After 60 measurements digital processor 56 may divide the accumulated sum by 60 to determine an average temperature during the time period of 60 seconds. Other time periods may be selected depending on the transient temperature excursions of a particular rotating machine. Digital processor 56 selects by way of selecting the rotating machine to be measured, a corresponding service factor constant (SF) which is the function of the power rating of the rotating machine and two aging constants, $T_R$ and HIC, as a function of the thermal class of the insulation used in the winding being measured in the particular rotating machine.

Digital processor 56 may then determine the consumed life of the insulation for each time period. An algorithm containing a weighted Arrhenius function which takes into account the service factor constant (SF) of the rotating machine and one or more aging constants, $T_R$ and HIC of the insulation. The consumed life may be determined by equations 1 and 2:

$$CL = t \, 2^x / SF \quad (1)$$

$$X = (T - T_R)/HIC \quad (2)$$

where t is the length of the time period, $T_R$ is the reference temperature of the insulation, T is the average temperature during the respective time period, t, SF is the service factor constant and HIC is the halving interval in °C. which is in aging constant for the insulation class.

Digital processor 56 then sums the determined consumed life for a plurality of consecutive time periods to provide a number indicative of the total consumed life over the plurality of consecutive time periods which may be displayed on display 66. The higher the consumed life for a plurality of consecutive time periods, the faster the aging has occurred of the insulation and the lesser is the remaining insulation life.

If thermal aging is the only cause for insulation failure, the knowledge of the insulations thermal history should lead to a quantative determination of the remaining life if some material parameters are known.

If the insulation is made of n molecules, the assumption is made that $n_1$ of molecules will remain as a result of aging at temperature T after a period of time $t_1$. The decay rate of the molecules from the insulation is shown in equation 3:

$$\frac{dn}{dt} = -kn \quad (3)$$

In a publication by L. J. Berberich and T. W Dakin, entitled "Guiding Principles in "Guiding Principles in the Thermal Evaluation of Electrical Insulation, AIEE Aug., 1956, the rate constant K in equation 3 is analogous to the Arrhenius chemical reaction rate shown in equation 4:

$$k = A \exp\left(-\frac{E}{RT}\right) \quad (4)$$

In equation 4, A is a constant, E is the activation energy and R is the universal gas constant. Similarily, k can be written as shown in equation 5.

$$k = A \exp\left(-\frac{B}{T}\right) \quad (5)$$

Substituting k from equation 5 into equation 3 yields equation 6.

$$\frac{dn}{n} = -A \exp\left(-\frac{B}{T}\right) dt \quad (6)$$

At the end of life period $T_f$, the insulation fails, at which $n_f$ molecules remain as a result of thermal aging under constant temperature T. Equation 6 may be solved as shown in equation 7.

$$\ln \frac{n_f}{n_o} = -A \exp\left(-\frac{B}{T}\right) t_f \quad (7)$$

In equation 7 at t=0, there are $n_o$ molecules. Equation 7 may be rearranged as shown in equation 8 and 8.1.

$$\ln\left(\ln \frac{n_o}{n_f}\right) = \ln(t_f) + \ln A - \frac{B}{T} \quad (8)$$

$$\left[\ln\left(\ln \frac{n_o}{n_f}\right) - \ln A\right] + \frac{B}{T} = \ln(t_f) \quad (8.1)$$

Since $n_o/n_f$ is related to the material property of the insulation, $n_o/n_f$ can be treated as a constant. Equation 8 may then be expressed as equation 9 and in turn equation 9 may be expressed as equation 10. In equation 10, the insulation life $t_f$ of the insulation is determined with respect to T provided the constants A" and B are known.

$$A' + \frac{B}{T} = \ln t_f \quad (9)$$

$$t_f = A'' \exp\left(\frac{B}{T}\right) \quad (10)$$

FIG. 4 is a graph of the insulation life $t_f$ versus temperature T (in K) using equation 10 where $t_f$ is in seconds and assuming A" equals 20 and B equals 1500. The values for A" and B are arbitrary. Curve 78 in FIG. 4 shows that as the insulation temperature increases the life of the insulation decreases. In FIG. 4 the ordinate represents insulation life in thousand seconds and the abcissa represents insulation temperature in degrees Kelvin.

Figure 5:
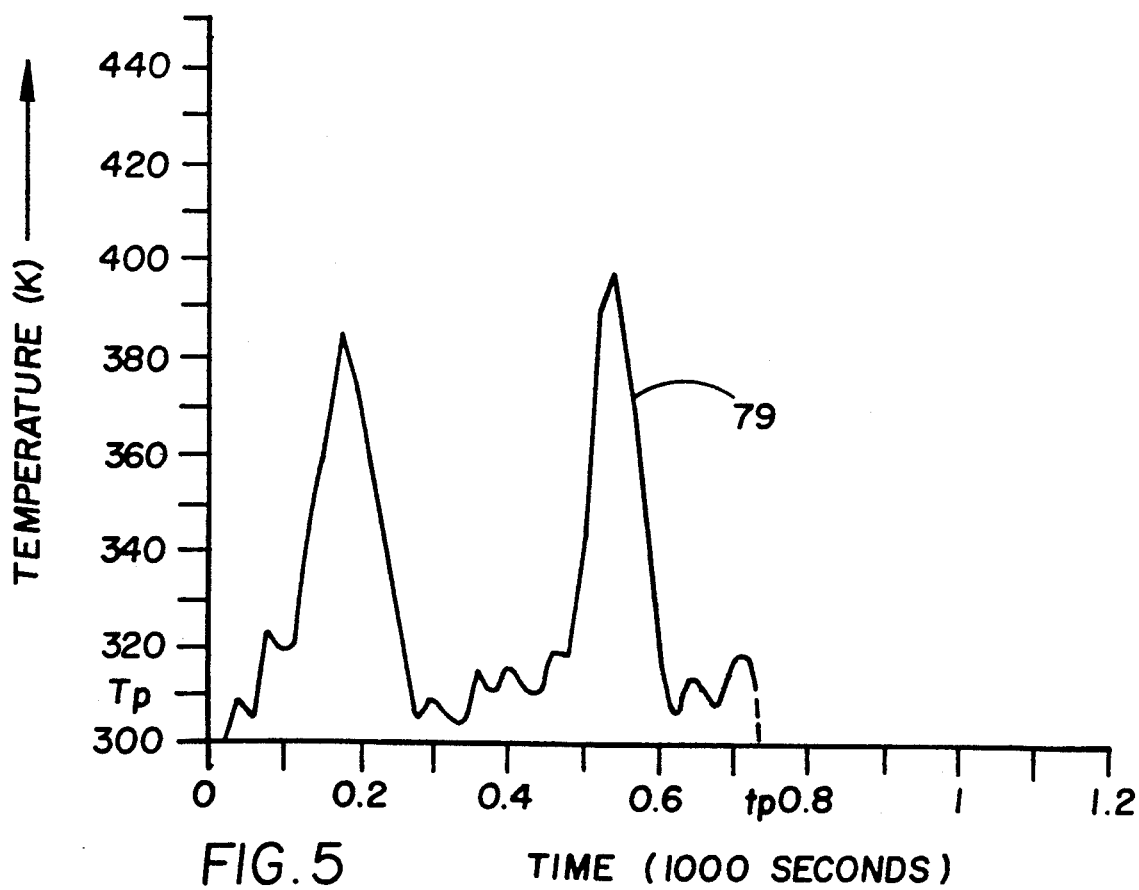
FIG. 5 is a graph of insulation temperature versus time.

FIG. 5 is a graph of insulation temperature versus time. In FIG. 5 the ordinate represents temperature in degrees Kelvin and the abcissa represents time in thousand seconds. When the insulation of a winding experiences various temperatures, for example, temperature excursions as shown in FIG. 5, the question of remaining life after a certain period is only meaningful when future operating temperatures are known. For example, after a time period $t_p$ the remaining life at temperature $T_p$ at 310° Kelvin may be determined. If $n_l$ molecules remain after the aging process of insulation for a period of $t_l$ at temperature $T_l$ similarily $n_2$ molecules of insulation remain after $t_2$, etc. Equations 11 and 12 follow from equation 7.

$$\ln\left(\frac{n_1}{n_0}\right) = -A \exp\left(-\frac{B}{T_1}\right) t_1 \quad (11)$$

$$\ln\left(\frac{n_2}{n_1}\right) = -A \exp\left(-\frac{B}{T_2}\right) t_2 \quad (12)$$

If the insulation is operated continuously at $T_1$, $T_2$, until failure at $t_{f1}$, $t_{f2}$, etc., equation 7 may be expressed as equations 13 and 14.

$$\ln\left(\frac{n_{f1}}{n_o}\right) = -A \exp\left(-\frac{B}{T_1}\right) t_{f1} \quad (13)$$

$$\ln\left(\frac{n_{f2}}{n_o}\right) = -A \exp\left(-\frac{B}{T_2}\right) t_{f2} \quad (14)$$

By dividing equation 11 by equation 13, equation 15 may be obtained. By dividing equation 12 by equation 14, equation 16 may be obtained.

$$\frac{\ln\left(\frac{n_1}{n_o}\right)}{\ln\left(\frac{n_{f1}}{n_o}\right)} = \frac{t_1}{t_{f1}} \quad (15)$$

$$\frac{\ln\left(\frac{n_2}{n_1}\right)}{\ln\left(\frac{n_{f2}}{n_o}\right)} = \frac{t_2}{t_{f2}} \quad (16)$$

If the total life of insulation consists of m time periods, then the summation of time periods $t_1$ through $t_m$ will equal the end of life period $t_f$ when the insulation fails as expressed in equation 17.

$$t_1 + t_2 + t_3 + \ldots + \frac{t}{m} = t_f \quad (17)$$

Since the last period at m is the failure time, $n_m = n_f$ then equation 18 is equal to 1.

$$\frac{t_1}{t_{f1}} + \frac{t_2}{t_{f2}} + \ldots \frac{t_m}{t_{fm}} = 1 \quad (18)$$

Equation 18 essentially shows that whenever the temperature of insulation is high for a long period of time, the fraction of remaining life will be reduced.

EXAMPLE I

If the insulation has constant $A''$ equal 20, B equal 1500, and the time/temperature history is given in FIG. 5 at $t_p$ of 740 seconds, then remaining life of the insulation may be determined if the future operating temperature is kept at 300 degrees Kelvin. $t_{f2}$ may be expressed as shown in Equation 19.

$$t_{f1} = A'' \exp\left(\frac{B}{T_1}\right) \quad (19)$$

Similarly, $t_{f2}$ can be evaluated as expressed in Equation 20.

$$\frac{t_m}{t_{fm}} = 1 - \sum_{i=1}^{p} \frac{t_i}{t_{fi}} \quad (20)$$

Figure 6:
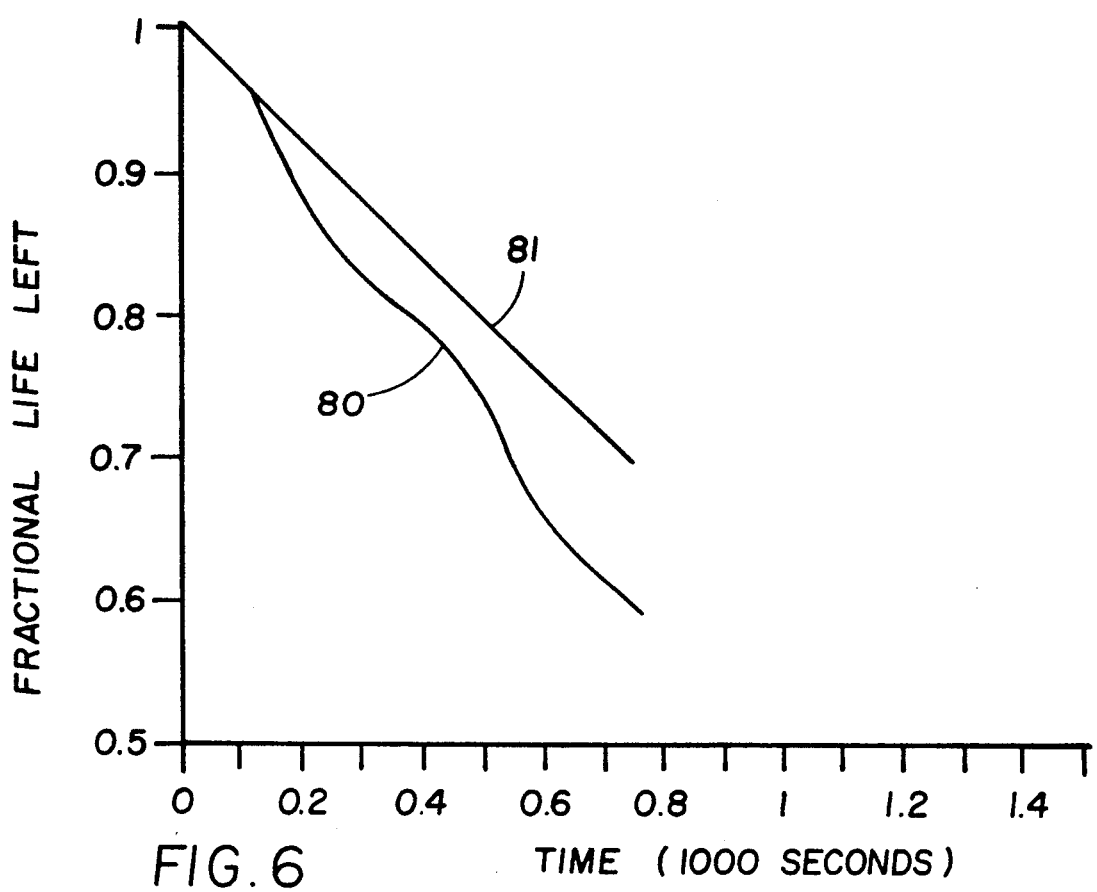
FIG. 6 is a graph of remaining insulation life versus time.

FIG. 6 is a graph of the remaining insulation life versus time. In FIG. 6 the ordinate represents fractional life left and the abscissa represents time in thousand seconds. The remaining life $t_m$ assuming the future operating temperature is 300 K., is then given by equation 21 which equals 1780 seconds.

$$t_m = \left(1 - \sum_{i=1}^{p} \frac{t_i}{t_{fi}}\right) \exp\left(A' + \frac{B}{300}\right) = 1780s \quad (21)$$

Figure 7:
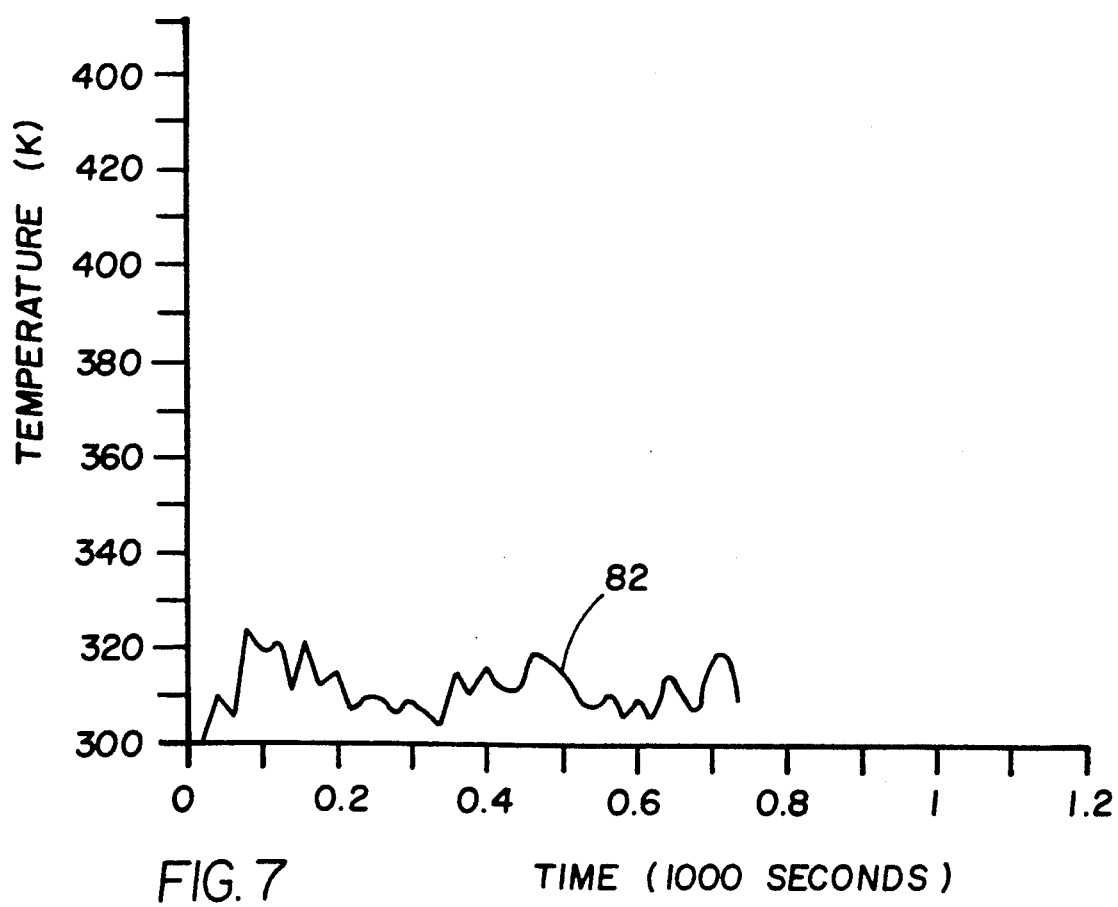
FIG. 7 is a graph of insulation temperature versus time.

Curve 80 is a plot of remaining life over time using the temperature history of the insulation shown in FIG. 5 where the remaining life would be at a temperature of 300 degrees Kelvin. FIG. 7 is a graph of the insulation temperature versus time. In FIG. 7, the ordinate represents temperature in degrees Kelvin and the abscissa represents time in thousand seconds. Curve 82 shows the temperature of insulation which was plotted from averaging the time period over each of a plurality of consecutive time period. Curve 81 shown in FIG. 6 is a plot of the remaining life wherein the insulation temperature over time is shown by curve 82 in FIG. 7 and the temperature has remained constant at 300° Kelvin.

As indicated in the above example, knowledge of the insulation material properties $A''$ and B, and the thermal history of the insulation are needed to estimate remaining life of the insulation. The future operating temperature can be assumed to be constant or cyclic. As long as the thermal history of the insulation can be constructed, the remaining insulation life can be estimated. The constants $A''$ and B are generic to the class of insulation material and has to be determined empirically. The real time measurement of the thermal history is the function of the thermal life indicator 10 shown in FIG. 1, which in turn may compute the consumed life of the insulation.

In large rotating machine systems, thermal aging is not the only factor affecting aging. The output of thermal life indicator 10 can only be a part of the factors for diagnostic or monitoring purposes.

A thermal life indicator and method for continuously determining the consumed insulation life of an electrical winding in a rotating machine has been described comprising the steps of selecting a service factor constant SF as a function of the power rating of the rotating machine containing the insulation, selecting 2 aging constants $T_R$ and HIC as a function of a thermal class of the insulation used in the winding, measuring the temperature of the insulation as a function of time during a time period, determining the average temperature of the insulation during each time period over a plurality of consecutive time periods, determining the consumed life of the insulation for each time period, and summing the determined consumed life for a plurality of consecutive time periods to provide a number indicative of the consumed life over the plurality of consecutive time periods.

What is claimed is:

1. An apparatus for continuously determining the consumed insulation life of an electrical winding in a rotating machine, comprising:

control panel means for allowing entry of a service factor constant SF and two aging constants $T_R$ and HIC, said factor constant SF being a function of the power rating of said rotating machine containing said insulation, and said aging constants being a function of the thermal class of the insulation used in said winding;

sensing means for measuring a temperature of said insulation;

clock means for specifying a present time and date, and for outputting a timing signal defining a recurring time period;

processing means coupled to said clock means and sensing means for receiving said timing signal, reading said measured temperature in accordance with said timing signal, determining the average temperature of the insulation during each said time period over a plurality of consecutive time periods, determining a consumed life of the insulation for each time period, and summing said determined consumed life for the plurality of consecutive time periods to determine a total consumed life over said plurality of consecutive time periods; and display means for displaying said total consumed life.

2. The apparatus according to claim 1, wherein said processing means determines said consumed life (CL) of the insulation for each time period by the expression $$CL = t \; 2^X/SF$$

where $$X = \frac{T - T_R}{HIC}$$

where t is the length of the time period, $T_R$ is a reference temperature of the insulation, T is a average temperature during the respective time period t, and HIC is a halving interval in °C., an aging constant for the insulation class.

* * * * *